United States Patent

[11] 3,620,997

| [72] | Inventor | Carl S. Marvel |
| | | Tucson, Ariz. |
| [21] | Appl. No. | 885,277 |
| [22] | Filed | Dec. 15, 1969 |
| [45] | Patented | Nov. 16, 1971 |
| [73] | Assignee | Research Corporation |
| | | New York, N.Y. |

[54] QUINOXALINE-ANTHRAQUINONE POLYMERS
5 Claims, No Drawings

[52] U.S. Cl..................................................... 260/50,
117/161, 260/30.6, 260/30.8, 260/32.6, 260/2,
260/63
[51] Int. Cl........................................................C08g 15/02,
C08g 33/02
[50] Field of Search............................................ 260/2, 47,
47 CZ, 63, 50, 65

[56] References Cited
UNITED STATES PATENTS

| 3,475,374 | 10/1969 | Marvel et al. ................... | 260/47 |
| 3,484,387 | 12/1969 | Jackson et al. ............... | 260/2 |

Primary Examiner—William H. Short
Assistant Examiner—L. L. Lee
Attorney—Stowell & Stowell ABSTRACT: Tetrachloroquinoxalines are condensed with 1,2,5,6-tetraaminoanthraquinone to produce polymers characterized by the presence of a quinoxaline nucleus and an anthraquinone nucleus in the repeating unit of the polymer. The polymers are useful in the preparation of heat-resistant articles intended for use at elevated temperatures.

QUINOXALINE-ANTHRAQUINONE POLYMERS

This invention relates to quinoxaline-anthraquinone polymer compositions.

The compositions of the present invention are condensed heterocyclic polymers characterized by the presence of a quinoxaline nucleus and an anthraquinone nucleus in the repeating unit of the polymer. These compositions melt above 360° C. and are further characterized by a high degree of thermal stability and stability to oxidation at elevated temperatures making them useful in the preparation of oxidation- and corrosion-resistant articles capable of use at temperatures in excess of 400° C.

More specifically, the polymer compositions of the present invention are characterized by the presence of the following recurring structural units:

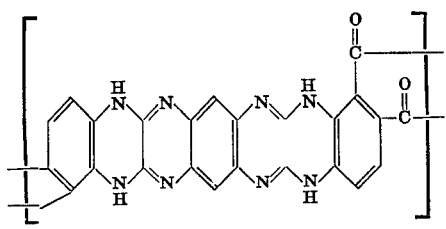

or

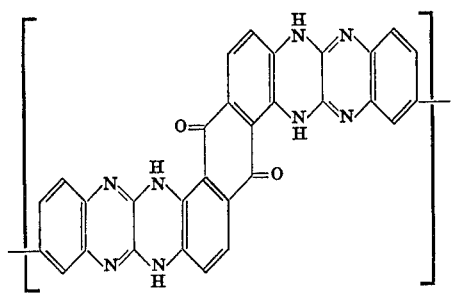

or

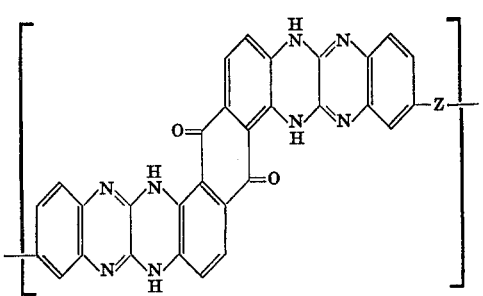

wherein Z is O or $SO_2$.

These polymers are prepared by the polycondensation reaction of 1,2,5,6-tetraaminoanthraquinone with 2,3,7,8-tetrachloro-1,4,6,9-tetraazaanthracene, 2,2',3,3'-tetrachloro-6,6'-diquinoxaline, 2,2',3,3'-tetrachloro-6,6'-diquinoxalyl ether and 2,2',3,3'-tetrachloro-6,6'-diquinoxalyl sulfone, respectively. While polycondensation can be effected in the melt, polymerization was generally carried out by mixing equimolecular amounts of 1,2,5,6-tetraaminoanthraquinone and the respective tetrachloro compound in pyridine, tetramethylene sulfone, N,N'-dimethylaniline or a mixture of N,N-dimethylacetamide and N,N-diethylaniline at room temperature. After stirring for 1 or 2 hours, the reaction mixture was heated for 20-24 hours; polymeric material usually precipitates out of the solution during the course of the reaction. The resultant solid was separated from the reaction mixture by filtration or by treatment with a suitable solvent followed by extraction in a Soxhlet extractor. The product polymers were heated at 330°–350° C. for several hours under reduced pressure to drive off any residual solvent and to complete ring closure condensation.

The present invention is further illustrated by means of the following examples which show the preparation of the intermediates utilized and representative polymers according to the invention.

I. INTERMEDIATES

A. 1,2,5,6-Tetraaminoanthraquinone

In a 500 ml. three-necked flask equipped with a heating jacket, a mechanical stirrer and a reflux condenser were placed 100 ml. of glacial acetic acid, 100 ml. of acetic anhydride, 50 g. of 2,6-diaminoanthraquinone, and about 0.5 ml. of concentrated sulfuric acid. The reaction mixture was heated to boiling and refluxed with stirring for 2 hours (the diaminoanthraquinone did not dissolve but changed color during acetylation). The reaction mixture was cooled, filtered and washed with some glacial acetic acid and the solid product dried in a vacuum oven. There was obtained 67 g. of 2,6-diacetaminoanthraquinone as a brown solid. The crude product was purified by recrystallization from acetic acid, nitrobenzene or most readily from dimethylformamide.

In a 500-ml. three-necked flask, equipped with a mechanical stirrer and a thermometer, was placed 400 g. of concentrated sulfuric acid and 50 g. of potassium nitrate. After cooling in an ice bath, 25 g. of finely divided diacetaminoanthraquinone was added to the vigorously stirred mixture keeping the temperature below 5° C. The diacetamino compound dissolved within thirty minutes and the nitration was continued for four hours at a 0°–5° C. The reaction mixture was decomposed with excess ice; the solid product was separated by filtration and washed thoroughly until the filtrate was acid free. After drying in a vacuum oven at 60° C., the yellow 1,5-dinitro-2,6-diacetaminoanthraquinone was purified by recrystallization from dimethylsulfoxide.

In a two-necked, 1-liter flask, equipped with a mechanical stirrer, 400 ml. of sulfuric acid was mixed with 200 ml. of water to give 80 percent sulfuric acid. The mixture was cooled and 40 g. of dinitrodiacetaminoanthraquinone added. The flask was then heated to 95° C. and held at this temperature for 90 minutes when hydrolysis was complete. The reaction mixture was poured on 1.5 kg. of ice, the solid product separated by filtration and washed until acid free. 1,5-Dinitro-2,6-diaminoanthraquinone was obtained as a dark brown filter cake.

The still wet cake, prepared as described above, was transferred to a two-necked, 1-liter flask, equipped with a mechanical stirrer. Additional water was added bringing the total weight of the cake plus the water to 400 g. 90 g. of $Na_2S_9 \cdot H_2O$ was added and the reaction mixture stirred while heated on a steam bath for 1 hour. The mixture turned violet as the reduction proceeded in solid phase. The flask was cooled, the product separated by filtration and washed several times with distilled water until the filtrate was neutral. The black product was dried in vacuo at 50° C. Twenty-five g. of dinitrodiacetaminoanthraquinone yielded 15 g. of tetraaminoanthraquinone which was purified by recrystallization from boiling acetophenone.

B. 2,3,7,8-Tetrachloro-1,4,6,9-tetraazaanthracene

Ten g. of 1,5-diamino-2,4-dinitrobenzene was hydrogenated in 50 ml. of dioxane at 60° C. with 1 g. of 5 percent Pd on charcoal as the catalyst. When the absorption of hydrogen had stopped, the reaction mixture was cooled and the solvent poured off under nitrogen and discarded. The tetramine was separated from the catalyst by dissolving it in 100 ml. of degassed 2N hydrochloric acid and filtering into 200 ml. of concentrated hydrochloric acid, and then boiled under reflux for 3 hours with 20 g. of oxalic acid. A nearly theoretical yield of 2,3,7,8-tetrahydroxy-1,4,6,9-tetraazaanthracene precipitated as a light brown solid.

A mixture of 12.3 g. of 2,3,7,8-tetrahydroxy-1,4,6,9-tetraazaanthracene, 62 g. of phosphorus oxychloride, and 123 g. of antimony trichloride were refluxed together for 7 hours. After cooling, the reaction mixture was poured onto a mixture of ice and concentrated hydrochloric acid. The residue was separated by centrifugation, washed successively with dilute hydrochloric acid, water and methanol, dried and then extracted with benzene in a Soxhlet apparatus. There was obtained 5.2 g. of product as pale yellow needles melting at 330° C.

C. 2,2',3,3'-Tetrachloro-6,6'-bisquinoxaline

A mixture of 2.2 g. of 3,3'-diaminobenzidine and 2.6 g. of oxalic acid dihydrate was dissolved in 20 ml. of 4N hydrochloric acid and the solution heated at reflux temperature for 3 hours. The reaction mixture was cooled, the cyclic diamide intermediate collected on a filter, washed with methanol and dried. Five g. of the intermediate was placed in a flask with 15 ml. of phosphorus oxychloride and 5 ml. of N,N-dimethylaniline. The solution was heated at reflux temperature for 3 hours, cooled, and poured into 100 ml. of ice water. The precipitate was collected on a filter, dried and extracted with hot benzene to yield 4.7 g. of product melting at 293°–294° C.

D. 2,2',3,3'-Tetrachloro 6,6'-diquinoxalyl ether

A mixture of 18.8 g. of 3,3,4,4'-tetraaminodiphenyl ether tetrahydrochloride and 12.6 g. of oxalic acid dihydrate was dissolved in 300 ml. of 4N hydrochloric acid and the solution refluxed for 3 hours. After cooling, the yellow precipitate was collected, washed with water and dried. The yield of 2,2',3,3'-tetrahydroxy-6,6'-diquinoxalyl ether was 96.3 percent.

A mixture of 10.1 g. of 2,2,3,3'-tetrahydroxy-6,6-diquinoxalyl ether, 27.5 ml. of phosphorus oxychloride and 20 ml. of N,N-dimethylaniline was refluxed for 3 hours. The dark brown viscous reaction mixture was poured into an ice-hydrochloric acid mixture to give a yellow precipitate, which was collected, washed with dilute hydrochloric acid and water, and dried. Extraction with boiling benzene gave a 72 percent yield of product melting at 219°–220° C.

E. 2,2',3,3'-Tetrachloro-6,6'-diquinoxalyl sulfone 3,3',4,4'-Tetraaminodiphenyl sulfone (3.0 g.) Kehrmann et al., Helv. Chem. Acta, 8, 16 (1925), and oxalic acid (1.85 g.) were dissolved in 75 ml. of 4N hydrochloric acid and the solution was heated to reflux for 5 hours. A light gray solid precipitated out of the solution during heating. After cooling, the solid collected on a filter, washed with dilute hydrochloric acid, and then with water until free of acid and dried under reduced pressure. The yield of 2,2',3,3'-tetrahydroxy-6,6'-diquinoxalyl sulfone was 3.91 g.

A mixture of 2,2',3,3'-tetrahydroxy-6,6'diquinoxalyl sulfone (3 g.), N,N-dimethylaniline (16 ml.) and phosphorus oxychloride (16 ml.) was heated to reflux for 5 hours. The resultant viscous reaction mixture was poured into a mixture of crushed ice and concentrated hydrochloric acid to give a black precipitate which was collected, washed with dilute hydrochloric acid and then with water until free of acid. The solid was extracted with absolute ethanol and the extract, after being concentrated to 50 ml., was allowed to stand in a freezer overnight. There was obtained 1.2 g. of product as lightly colored crystals.

II. POLYMERS

A. Poly[5,9,14,18-tetrahydrobenzo[1''',2''':5,6:4''',5''';5',6']aydipyrazino[2,3-b:2',3'-b]diquinxaline-1,2:10,11-tetrayl)-10,11-dicarbonyl]

Into a 200 ml. round bottom flask was placed 2.1 g. of 2,3,7,8-tetrachloro-1,4,6,9-tetraazaathracene in 55 ml. of freshly distilled dry pyridine and then 1.73 g. of 1,2,5,6-tetraaminoanthraquinone. The reaction mixture was refluxed and stirred for 2 hours under a nitrogen atmosphere. The resultant black solid was separated by filtration, washed with pyridine and then with ether, and dried at 50° C. under reduced pressure. The dried product was heated at 350° C. for 6 hours under vacuum. The final product after successive extraction with ethanol and benzene had an inherent viscosity of 0.44, 0.1 percent in concentrated sulfuric acid at 30° C.

B. Poly(6,7,10,17,18,21-hexahydro-7,18-dioxodiquinoxalino[2,3-b:2',3'-b]benzo[1,2-f:4,5-f']diquinoxaline-2,14-diyl)

To a solution of 1,2,5,6-tetraaminoanthraquinone (0.67 g.) in pyridine (40 ml.) was added 2,2',3,3'-tetrachloro-6,6'-diquinoxaline (0.995 g.) at room temperature. After stirring for 2 hours, the reaction mixture was refluxed for 20 hours under nitrogen. The cooled reaction mixture was filtered, the resultant black solid washed with pyridine and followed by ether and then heated at 320° C. for 6 hours under vacuum (0.05 mm. Hg). The polymer was purified by extraction with ethyl alcohol for 5 days and benzene for 3 days. The yield, after drying at 60° C. under reduced pressure, was 1.3 g. of product having an inherent viscosity of 0.1, 0.42 percent in concentrated sulfuric acid at 30° C.

C. Poly [6,7,10,17,18,21-hexahydro-7,18-dioxodiquinoxalino[2,3-b:2',3'-b]benzo[1,2-f:4,5-f']diquinoxaline-2,14-diyl)oxy]

A mixture of 1,2,5,6-tetraaminoanthraquinone (0.67 g.), 2,2',3,'6,6'-diquinoxalyl ether (1.03 g.) and freshly distilled pyridine (50 ml.) was refluxed for 20 hours under a nitrogen atmosphere. After cooling, the resultant solid was separated by filtration, washed several times with pyridine and ethanol and extracted with ethanol and then benzene for 1 day. The black residue was heated at 350° C. for 6 hours under vacuum and extracted as before with ethanol and benzene in a Soxhlet extractor. The yield of product polymer was 1.15 g. having an inherent viscosity of 0.16, 0.2 percent in concentrated sulfuric acid at 30° C.

The same reaction was repeated using a mixture of N,N-dimethyl acetamide and N,N-diethlaniline as the solvent. The inherent viscosity was 0.13, 0.22 percent in concentrated sulfuric acid at 30° C.

D. Poly[6,7,10,17,18,21-hexahydro-7,18-dioxodiquinoxalino[2,3,-b:2',3'-b]benzo[1,2-f:4,5-f']diquinoxaline-2,14-diyl)sulfone]

A mixture of 1,2,5,6-tetraaminoanthraquinone (0.67 g.), 2,2'3,3'6,6'diquinoxalyl sulfone (1.15 g.), N,N-dimethylacetamide (40 ml.) and N,N-dimethylaniline (10 ml.) was refluxed with stirring for 16 hours under nitrogen. After cooling, 300 ml. of water was added to the reaction mixture and the resultant black solid separated, washed with water and alcohol several times, and then dried. The dried solid was heated slowly at 350° C. for 6 hours under vacuum and subsequently extracted with ethanol and benzene for 3 days. The yield of produce polymer was 1.35 g. having an inherent viscosity of 0.23, 0.12 percent in concentrated sulfuric acid at 30° C.

The polymeric compositions of the present invention are highly colored powdery materials, insoluble in common organic solvents and vary difficulty soluble in such solvents as hexamethylphosphoramide, N,N-dimethylacetamide, tetramethylene sulfone and dimethylsulfoxide. However, they are sufficiently soluble in concentrated sulfuric acid and methanesulfonic acid to be spun into fibers by conventional wet spinning techniques. The weight loss observed was minimal at temperatures up to about 400° C. (thermogravimetric analysis of representative polymers in nitrogen or helium with heating at the rate of 150°–180° C. per hour). These polymers, being thermally resistant, did not always burn completely during the course of a carbon-hydrogen combustion analysis yielding analytical values somewhat different than the theroetical; their structures were confirmed by comparison with model compounds.

The polymeric compositions of the present invention may be formed into fibers, cast as films or otherwise converted to shaped articles wherein their unique stability to elevated temperatures may be effectively utilized. The fibers, generally mixed with other fibers, may be woven or knit into heat-resistant fabrics. The polymeric films may be utilized as coatings to protect susceptible articles from corrosion and other adverse effects accelerated by exposure to elevated temperatures.

I claim:

1. Fiber and film forming polymers consisting essentially of the recurring structural unit:

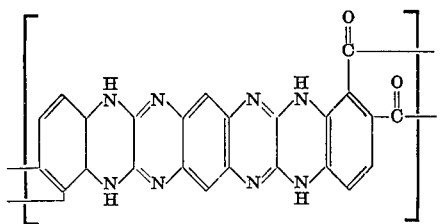

2. Fiber and film forming polymers consisting essentially of the recurring structural unit:

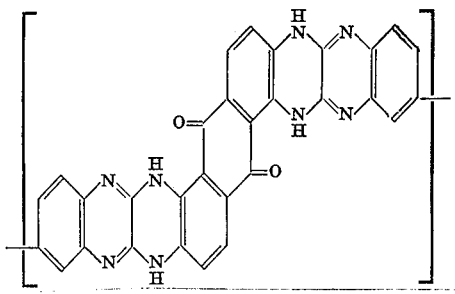

3. Fiber and film forming polymers consisting essentially of the recurring structural unit:

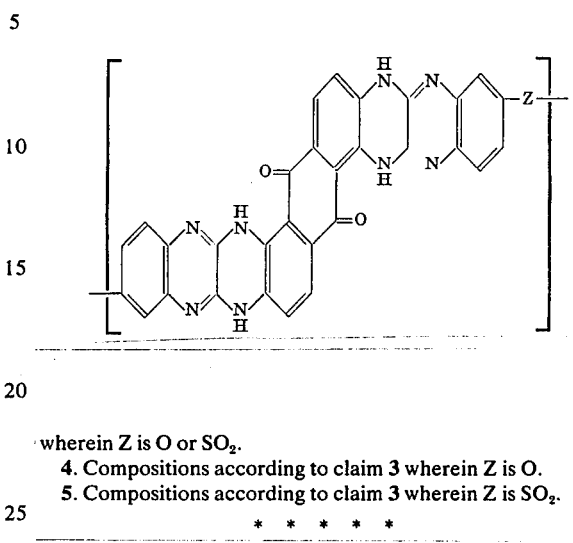

wherein Z is O or $SO_2$.

4. Compositions according to claim 3 wherein Z is O.

5. Compositions according to claim 3 wherein Z is $SO_2$.